(12) United States Patent
Li et al.

(10) Patent No.: US 12,444,055 B2
(45) Date of Patent: Oct. 14, 2025

(54) CONVOLUTION AND TRANSFORMER-BASED IMAGE SEGMENTATION

(71) Applicant: QUALCOMM Incorporated, San Diego, CA (US)

(72) Inventors: Xin Li, San Diego, CA (US); Jiancheng Lyu, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 18/316,823

(22) Filed: May 12, 2023

(65) Prior Publication Data

US 2024/0378727 A1    Nov. 14, 2024

(51) Int. Cl.
*G06T 7/11*        (2017.01)
(52) U.S. Cl.
CPC ...... *G06T 7/11* (2017.01); *G06T 2207/20084* (2013.01)
(58) Field of Classification Search
CPC . G06T 7/11; G06T 2207/20084; G06N 3/045; G06N 3/08; G06V 10/82
See application file for complete search history.

(56) References Cited

U.S. PATENT DOCUMENTS

| | | | |
|---|---|---|---|
| 11,971,955 B1* | 4/2024 | Chakraborty | G06F 3/04845 |
| 12,061,094 B2* | 8/2024 | Iqbal | G06V 20/588 |
| 12,094,159 B1* | 9/2024 | Akbas | G06V 40/10 |
| 12,347,068 B2* | 7/2025 | Liu | G06T 3/4053 |
| 2015/0279113 A1* | 10/2015 | Knorr | G06T 7/11 |
| | | | 345/633 |
| 2020/0302225 A1* | 9/2020 | Dutta | G06V 10/7715 |
| 2021/0012576 A1* | 1/2021 | Riegler | G06N 3/08 |
| 2021/0209837 A1* | 7/2021 | Chen | G06T 15/506 |
| 2023/0101653 A1* | 3/2023 | Matsumura | G06V 40/10 |
| | | | 382/159 |

(Continued)

OTHER PUBLICATIONS

Li, Lingling et al. "Scale-Insensitive Object Detection via Attention Feature Pyramid Transformer Network" Neural Processing Letters (2022) 54:581-595 (Year: 2021).*

(Continued)

*Primary Examiner* — Mia M Thomas
(74) *Attorney, Agent, or Firm* — Polsinelli LLP

(57) ABSTRACT

Techniques are provided for image processing. For instance, a process can include obtaining an image; extracting a first set of features at a first scale resolution; extracting a second set of features at a second scale resolution (lower than the first scale resolution); performing a self-attention transform to generate similarity scores for the second set of features; adding the similarity scores to the second set of features to generate a first feature extractor output; up-sampling the first feature extractor output to generate a second feature extractor output; adding the second feature extractor output to the first set of features to generate a third feature extractor output; receiving an instance query; performing a cross-attention transform on the instance query and the first feature extractor output to generate a set of weights; and matrix multiplying the set of weights and the third feature extractor output to generate instance masks.

30 Claims, 8 Drawing Sheets

(56) References Cited

U.S. PATENT DOCUMENTS

| | | | |
|---|---|---|---|
| 2023/0245495 A1* | 8/2023 | Ninh | G06V 40/168 |
| | | | 382/118 |
| 2023/0298272 A1* | 9/2023 | Ezhov | A61C 9/0053 |
| | | | 345/423 |
| 2023/0306600 A1* | 9/2023 | Zhang | G06T 7/11 |
| 2023/0377093 A1* | 11/2023 | Djelouah | G06T 3/4046 |
| 2023/0386052 A1* | 11/2023 | Lyu | G06V 10/62 |
| 2023/0410339 A1* | 12/2023 | Sawarkar | G06N 3/0895 |
| 2024/0029203 A1* | 1/2024 | Xu | G06T 5/50 |
| 2024/0062365 A1* | 2/2024 | Shen | G06T 7/11 |
| 2024/0070809 A1* | 2/2024 | Xu | G06T 3/4053 |
| 2024/0089580 A1* | 3/2024 | Nomura | G06V 40/10 |
| 2024/0249434 A1* | 7/2024 | Hong | G06F 16/55 |
| 2024/0265676 A1* | 8/2024 | Janoušková | G06N 3/045 |
| 2024/0412319 A1* | 12/2024 | Singh | G06T 3/02 |

OTHER PUBLICATIONS

International Search Report and Written Opinion—PCT/US2024/018663—ISA/EPO—Jun. 27, 2024.

Karim R., et al., "MED-VT: Multiscale Encoder-Decoder Video Transformer with Application to Object Segmentation", arXiv:2304.05930v1 [cs.CV], arxiv.org, Cornell University Library, 201 Olin Library Cornell University Ithaca, NY 14853, Apr. 12, 2023, 17 Pages, XP091482851, Section 3, Figure 2.

Li L., et al., "Scale-Insensitive Object Detection via Attention Feature Pyramid Transformer Network", Neural Processing Letters, Kluwer Academic Publishers, Norwell, MA, US, vol. 54, No. 1, Oct. 19, 2021, pp. 581-595, XP037702396, Section 3, Figures 1-3.

Zhu X., et al., "Deformable Detr: Deformable Transformers for End-to-End Object Detection", arXiv:2010.04159v4 [cs.CV], Mar. 18, 2021, pp. 1-16, XP093174967, Section 4, Figures 1, 2.

* cited by examiner

FIG. 2A   FIG. 2B

CONVOLUTION AND TRANSFORMER-BASED IMAGE SEGMENTATION

FIELD

The present application is related to image processing. For example, aspects of the present application relate to systems and techniques for convolution and transformer-based image segmentation.

BACKGROUND

Many devices and systems allow image and/or video data to be processed and this processed output may be used for a variety of operations, such as local mapping, object avoidance, virtually interacting with or responding to objects in the environment, and a host of other operations. One process that may be performed on images and/or video is object segmentation. Object (or image) segmentation may divide (e.g., segment) an image into groups (e.g., sub-images, image segments, etc.) represented by a mask or label. In some cases, the segments may correspond to objects or other elements of the environment. For example, one segment may correspond to people in the image, another segment may correspond to a background of the image, another segment may correspond to trees in the image, and so forth. The segmented objects/elements may then be output for use by other applications.

SUMMARY

Systems and techniques are described herein for image processing. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, apparatuses, methods and computer-readable media for image processing are provided. In one illustrative example, an apparatus for image processing is provided. The apparatus includes a memory and a processor coupled to the memory. The processor is configured to: obtain an image of an environment; extract a first set of features at a first scale resolution of the image; extract a second set of features at a second scale resolution of the image, wherein the second scale resolution is lower than the first scale resolution; perform a self-attention transform to generate similarity scores for the second set of features; add the similarity scores to the second set of features to generate a first feature extractor output; up-sample the first feature extractor output to generate a second feature extractor output; add the second feature extractor output to the first set of features to generate a third feature extractor output; receive an instance query for instances of a feature; perform a cross-attention transform on the instance query and the first feature extractor output to generate a first set of weights; perform a matrix multiplication on the first set of weights and the third feature extractor output to generate instance masks for the image; and output the instance masks.

As another example, a method for image processing is provided. The method includes: obtaining an image of an environment; extracting a first set of features at a first scale resolution of the image; extracting a second set of features at a second scale resolution of the image, wherein the second scale resolution is lower than the first scale resolution; performing a self-attention transform to generate similarity scores for the second set of features; adding the similarity scores to the second set of features to generate a first feature extractor output; up-sampling the first feature extractor output to generate a second feature extractor output; adding the second feature extractor output to the first set of features to generate a third feature extractor output; receiving an instance query for instances of a feature; performing a cross-attention transform on the instance query and the first feature extractor output to generate a first set of weights; performing a matrix multiplication on the first set of weights and the third feature extractor output to generate instance masks for the image; and outputting the instance masks.

In another example, a non-transitory computer-readable medium having stored thereon instructions is provided. The instructions, when executed by a processor, cause the processor to: obtain an image of an environment; extract a first set of features at a first scale resolution of the image; extract a second set of features at a second scale resolution of the image, wherein the second scale resolution is lower than the first scale resolution; perform a self-attention transform to generate similarity scores for the second set of features; add the similarity scores to the second set of features to generate a first feature extractor output; up-sample the first feature extractor output to generate a second feature extractor output; add the second feature extractor output to the first set of features to generate a third feature extractor output; receive an instance query for instances of a feature; perform a cross-attention transform on the instance query and the first feature extractor output to generate a first set of weights; perform a matrix multiplication on the first set of weights and the third feature extractor output to generate instance masks for the image; and output the instance masks.

As another example, an apparatus for image processing is provided. The apparatus includes: means for obtaining an image of an environment; means for extracting a first set of features at a first scale resolution of the image; means for extracting a second set of features at a second scale resolution of the image, wherein the second scale resolution is lower than the first scale resolution; means for performing a self-attention transform to generate similarity scores for the second set of features; means for adding the similarity scores to the second set of features to generate a first feature extractor output; means for up-sampling the first feature extractor output to generate a second feature extractor output; means for adding the second feature extractor output to the first set of features to generate a third feature extractor output; means for receiving an instance query for instances of a feature; means for performing a cross-attention transform on the instance query and the first feature extractor output to generate a first set of weights; means for performing a matrix multiplication on the first set of weights and the third feature extractor output to generate instance masks for the image; and means for outputting the instance masks.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 2A is a diagram illustrating an example of a fully-connected neural network, in accordance with some examples of the present disclosure;

FIG. 2B is a diagram illustrating an example of a locally-connected neural network, in accordance with some examples of the present disclosure;

DETAILED DESCRIPTION

Figure 1:
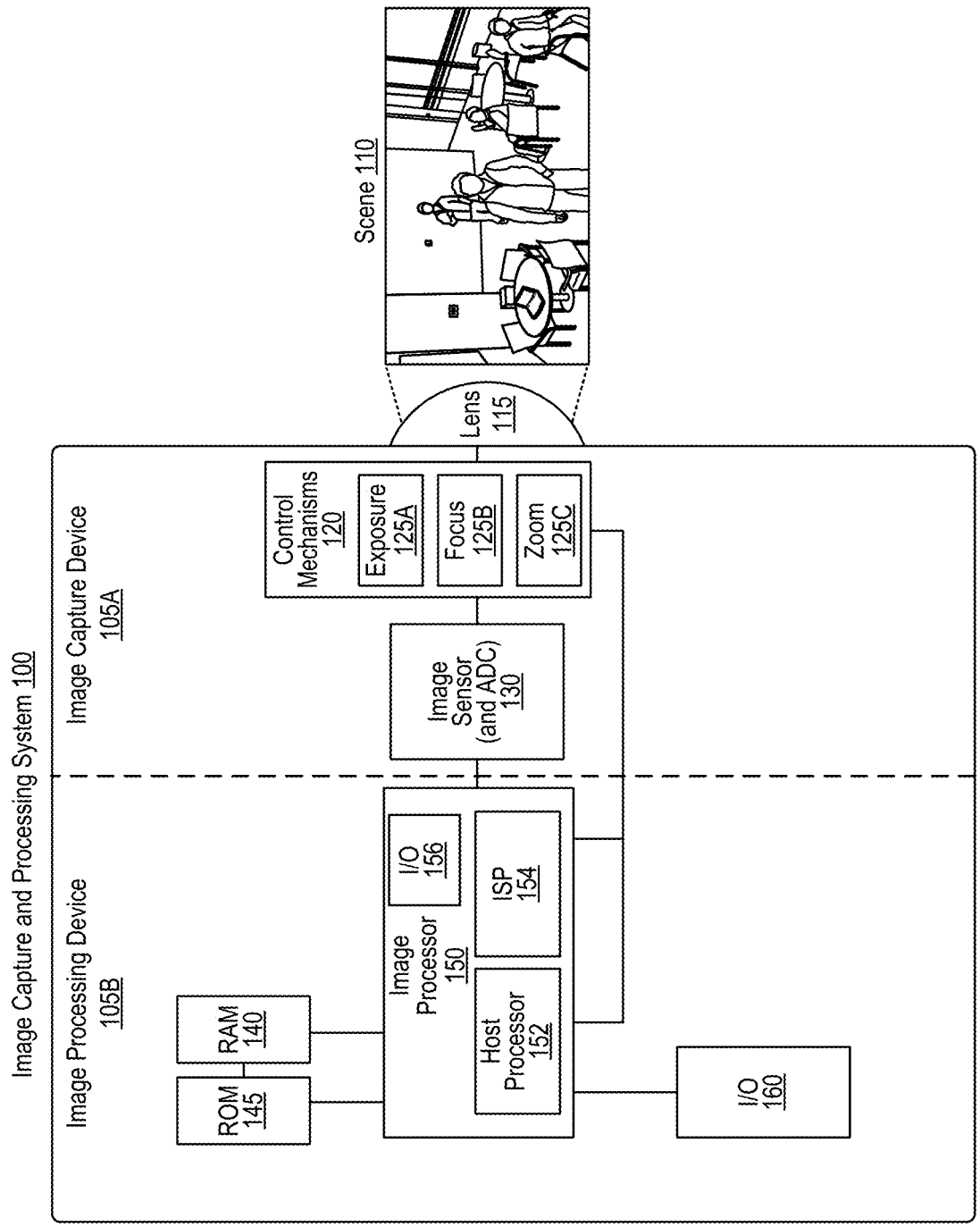
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

In some cases, a machine learning (ML) model, such as a convolutional neural network (CNN) may be used to perform image segmentation. Traditionally, a CNN for image segmentation may include portions of the CNN trained to recognize specific categories of objects/elements, such as one portion trained to recognize the sky, another to recognize trees, and so forth. However, such designs can be time consuming to train as each portion may be trained separately. Additionally, such designs can be inflexible as certain categories may need to be fixed while other categories are trained. As an example, training of a portion of a CNN to recognize faces may need to be fixed before another portion can be trained to recognize eyes. In some cases, this can result in lower performance for certain categories as fewer layers may be used for later trained categories. Improvements to ML models for performing image segmentation are thus needed to help improve model training and flexibility.

In some cases, image segmentation can be performed using a feature extracting backbone along with additional convolutional layers to form a CNN based solution for image segmentation. However, CNN based image segmentation can be time consuming to train and may have difficulties handling overlapping categories (e.g., a face category overlapping on nose/mouth/eye categories).

Recently, transformer networks have been explored for image segmentation. Transformer networks, in some cases, are neural networks which attempt to learn context about features to try to detect subtle patterns in data to determine how certain portions of the data may influence other portions. As transformer networks attempt to detect patterns in data, they can be somewhat easier to train as transformer networks may not need labelled datasets to find patterns. In some cases, transformer networks may take features as inputs and tag features. Attention (e.g., self-attention) units may be used to track the tagged features to map how different features may be related. However, using transformer networks for image segmentation with relatively high-resolution images can be resource intensive due to many redundant calculations, extensive scaling, and/or extensive post-processing. In some cases, it may be useful to combine aspects of CNN based image segmentation with aspects of transformer networks to help improve performance of image segmentation.

Systems, apparatuses, electronic devices, methods (also referred to as processes), and computer-readable media (collectively referred to herein as "systems and techniques") are described herein for a convolution and transformer-based image segmentation of features/objects in an image. For example, sets of features may be extracted as feature maps by blocks of a CNN based backbone. In some cases, these sets of features may be extracted at different scale resolutions of an input image. In some cases, a self-attention transform may be performed for pixels of a first feature map to generate similarity scores indicating how similar a pixel of the first feature map is to other pixels of the feature map. This first feature map may be a relatively low scale resolution feature map. In some cases, the first feature map may be lowest scale resolution feature map extracted from the image. The similarity scores may be added to the first feature map and a convolution operation performed to generate a first feature extractor output. This first feature extractor output may be up-sampled and added to a second feature map. The second feature map may be a higher resolution feature map. The output of this addition may be up-sampled again for addition with another higher resolution feature map. This may be repeated until the addition is performed with a highest resolution feature map to generate third feature extractor output. A cross-attention transform may also be performed on the first feature extractor output and output of the cross-attention transform may be matrix multiplied with the third feature extractor output to generate instance masks. Instance classes may be generated based on the output of the cross-attention transform.

In some cases, a cross-attention transform may be performed on the second feature extractor output and a semantic query. The output of the cross-attention transform may be matrix multiplied with the third feature extractor output to generate semantic masks for features/categories in the image.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 6:
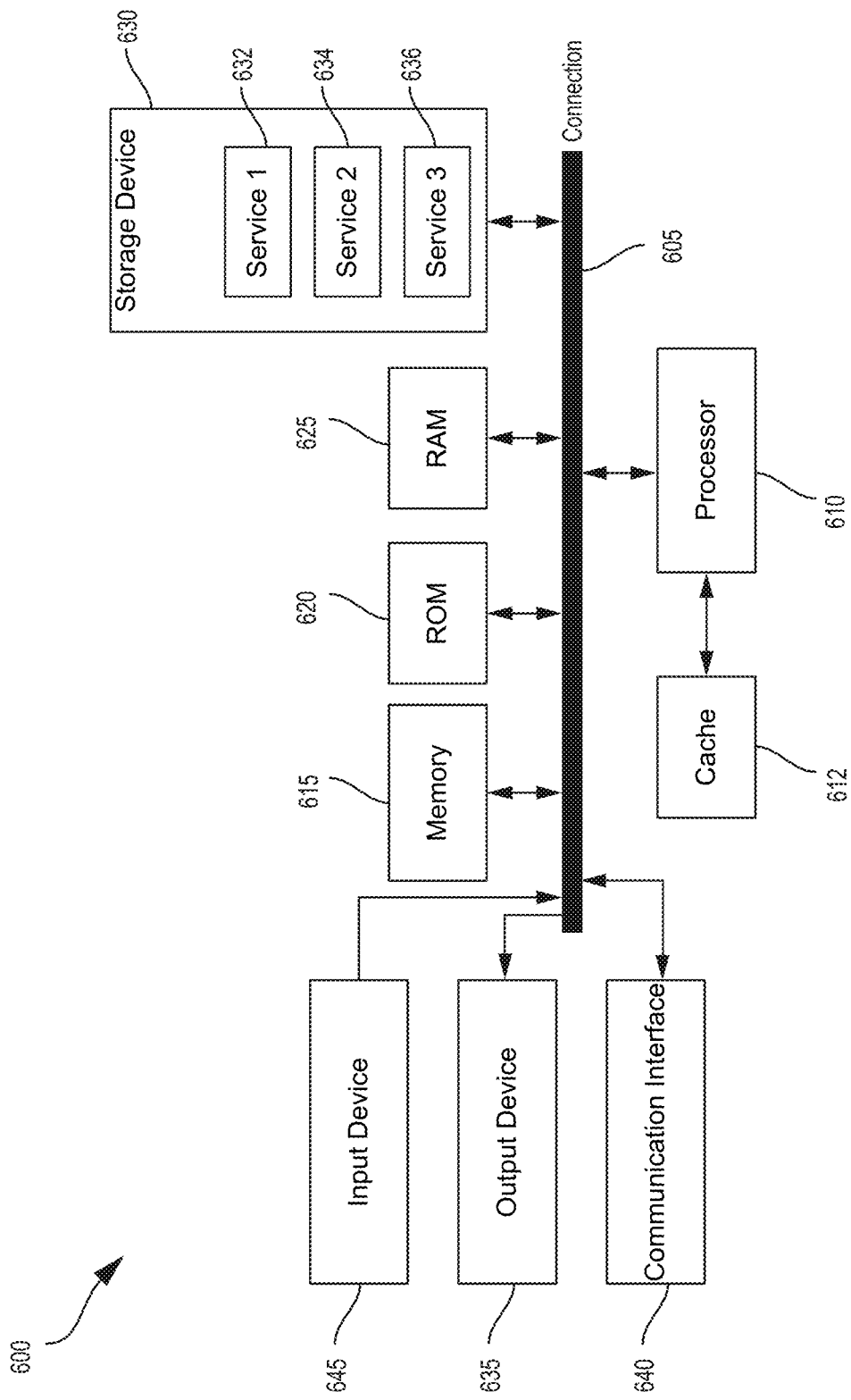
FIG. 6 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1010 discussed with respect to the computing system 600 of FIG. 6. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some cases, images captured by the image capture and processing system 100 may be processed by neural networks and/or machine learning (ML) systems. A neural network is an example of an ML system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 2A-FIG. 3.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
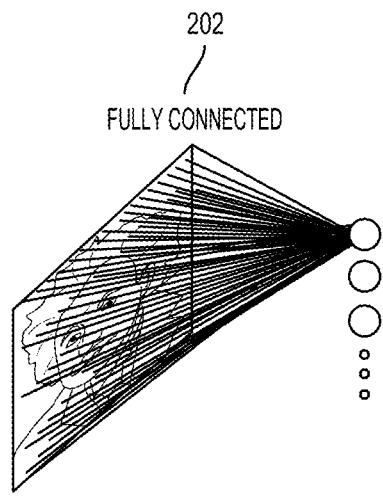
FIG. 2C is a diagram illustrating an example of a convolutional neural network, in accordance with some examples of the present disclosure.
Figure 2C:
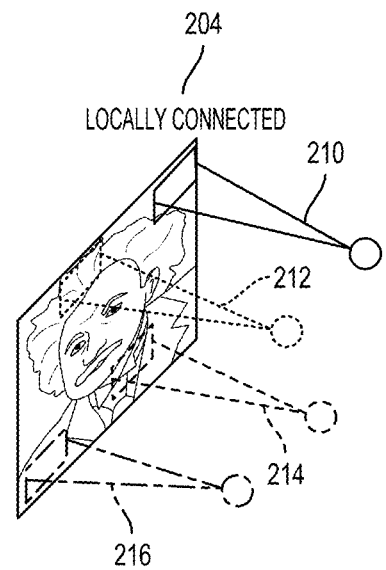
Figure 2C:
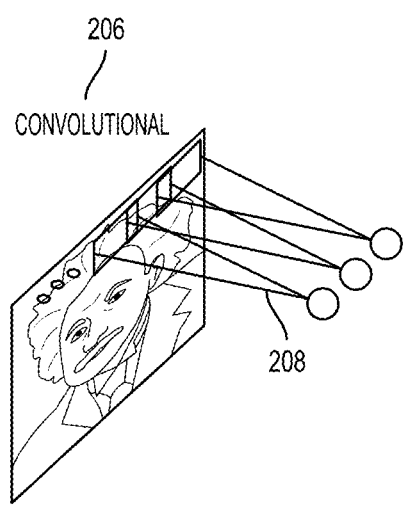

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
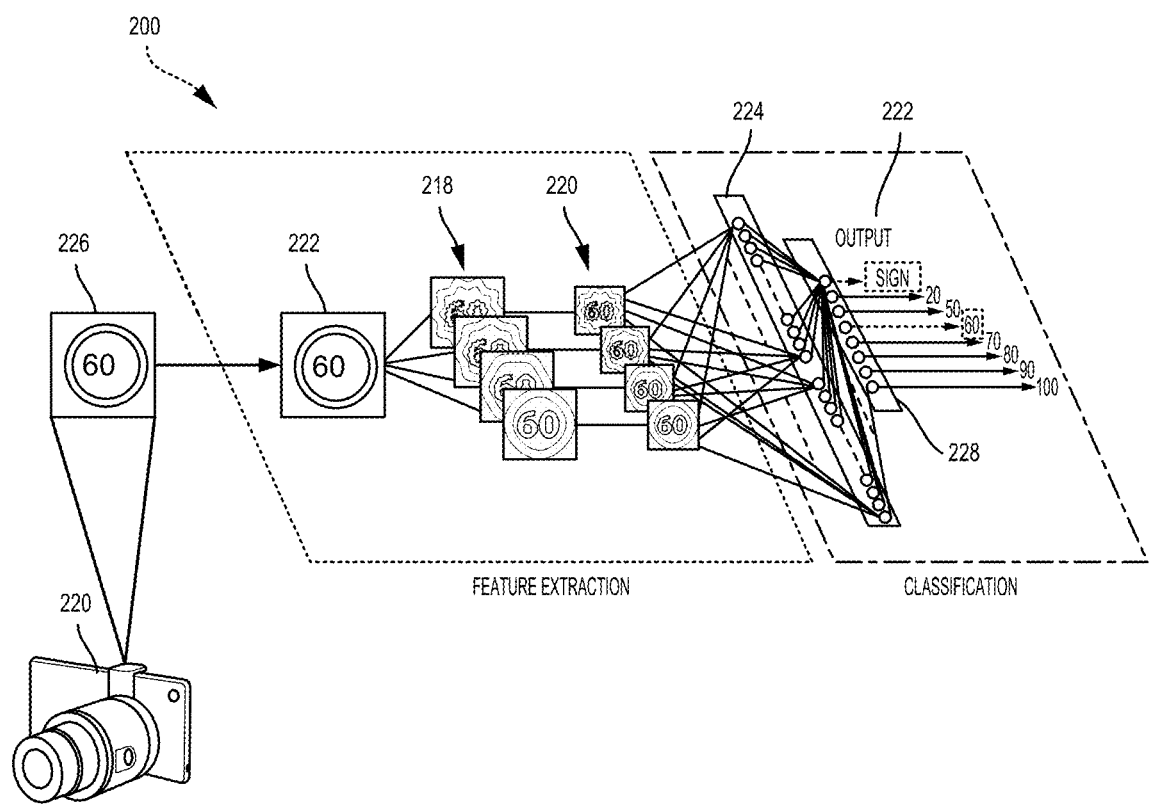
FIG. 2D is a diagram illustrating an example of a deep convolutional network (DCN) for recognizing visual features from an image, in accordance with some examples of the present disclosure.

One type of convolutional neural network is a deep convolutional network (DCN). FIG. 2D illustrates a detailed example of a DCN 200 designed to recognize visual features from an image 226 input from an image capturing device 230, such as a image capture and processing system 100 of FIG. 1. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption.

The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
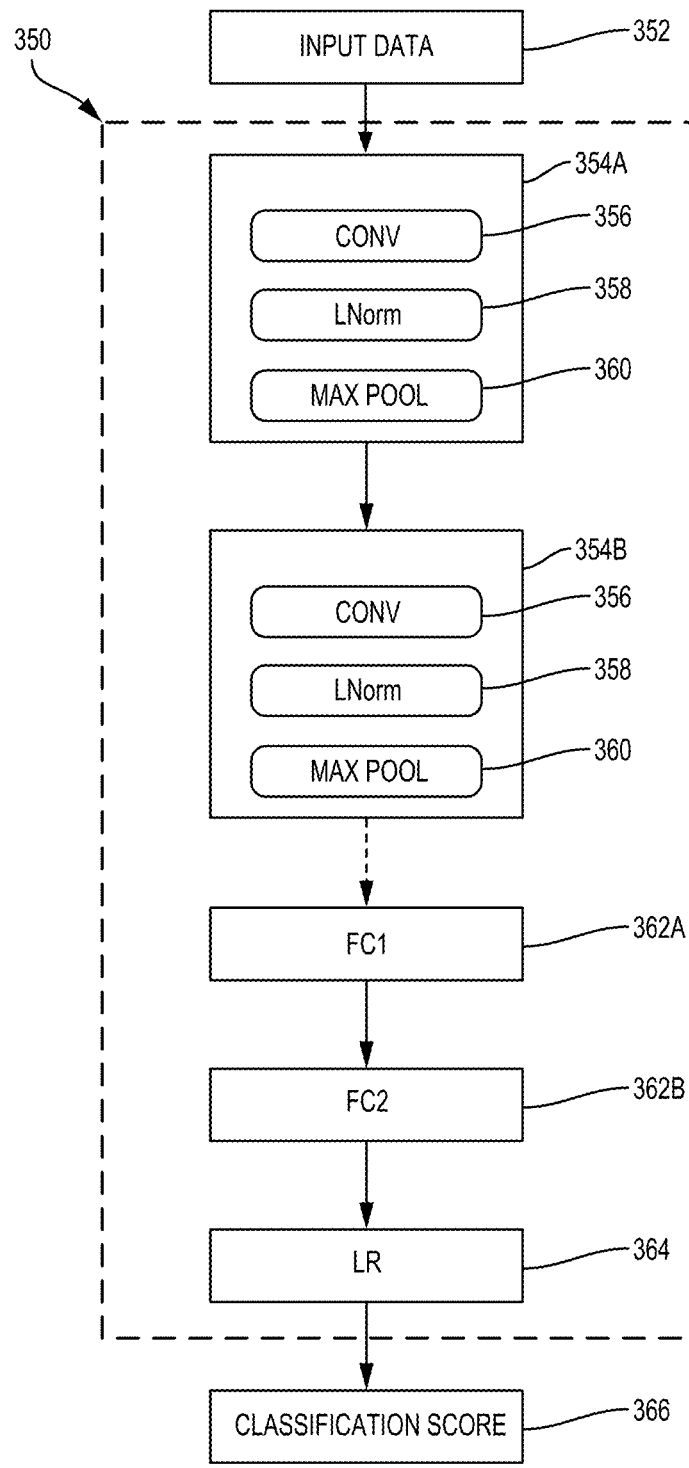
FIG. 3 is a block diagram illustrating an example deep convolutional network (DCN), in accordance with some examples of the present disclosure.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360. Of note, the layers illustrated with respect to convolution blocks 354A and 354B are examples of layers that may be included in a convolution layer and are not intended to be limiting and other types of layers may be included in any order.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., convolution blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a processor such as a CPU or GPU, or any other type of processor 1010 discussed with respect to the computing system 1000 of FIG. 10 to achieve high performance and low power consumption. In alternative aspects, the parallel filter banks may be loaded on a DSP or an ISP of the computing system 1000 of FIG. 10. In addition, the deep convolutional network 350 may access other processing blocks that may be present on the computing system 1000 of FIG. 10, such as sensor processor and navigation module, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362A, 362B, 364 of the deep convolutional network 350 are weights (not shown) that are to be updated. The output of each of the layers (e.g., 356, 358, 360, 362A, 362B, 364) may serve as an input of a succeeding one of the layers (e.g., 356, 358, 360, 362A, 362B, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

In some cases, one or more convolutional networks, such as a DCN, may be incorporated into more complex ML networks. As an example, as indicated above, the deep convolutional network 350 may output probabilities that an input data, such as an image, includes certain features. The deep convolutional network 350 may then be modified to extract (e.g., output) certain features. Additionally, DCNs may be added to extract other features as well. This set of DCNs may function as feature extractors to identify features in an image. In some cases, feature extractors may be used as a backbone for additionally ML network components to perform further operations, such as image segmentation.

As noted previously, transformer networks may be used for image segmentation in some cases. A transformer network can include a neural network that can learn context about features to try to detect patterns in data to determine how certain portions of the data may influence other portions. In some cases, a transformer network may tag features that are input to the transformer network. The transformer network may include attention units (e.g., self-attention units) that can be used to map how different features may be related. Using transformer networks for image segmentation can be resource intensive due to many redundant calculations, extensive scaling, and/or extensive post-processing, which can be even more resource-intensive for with relatively high-resolution images.

Figure 4:
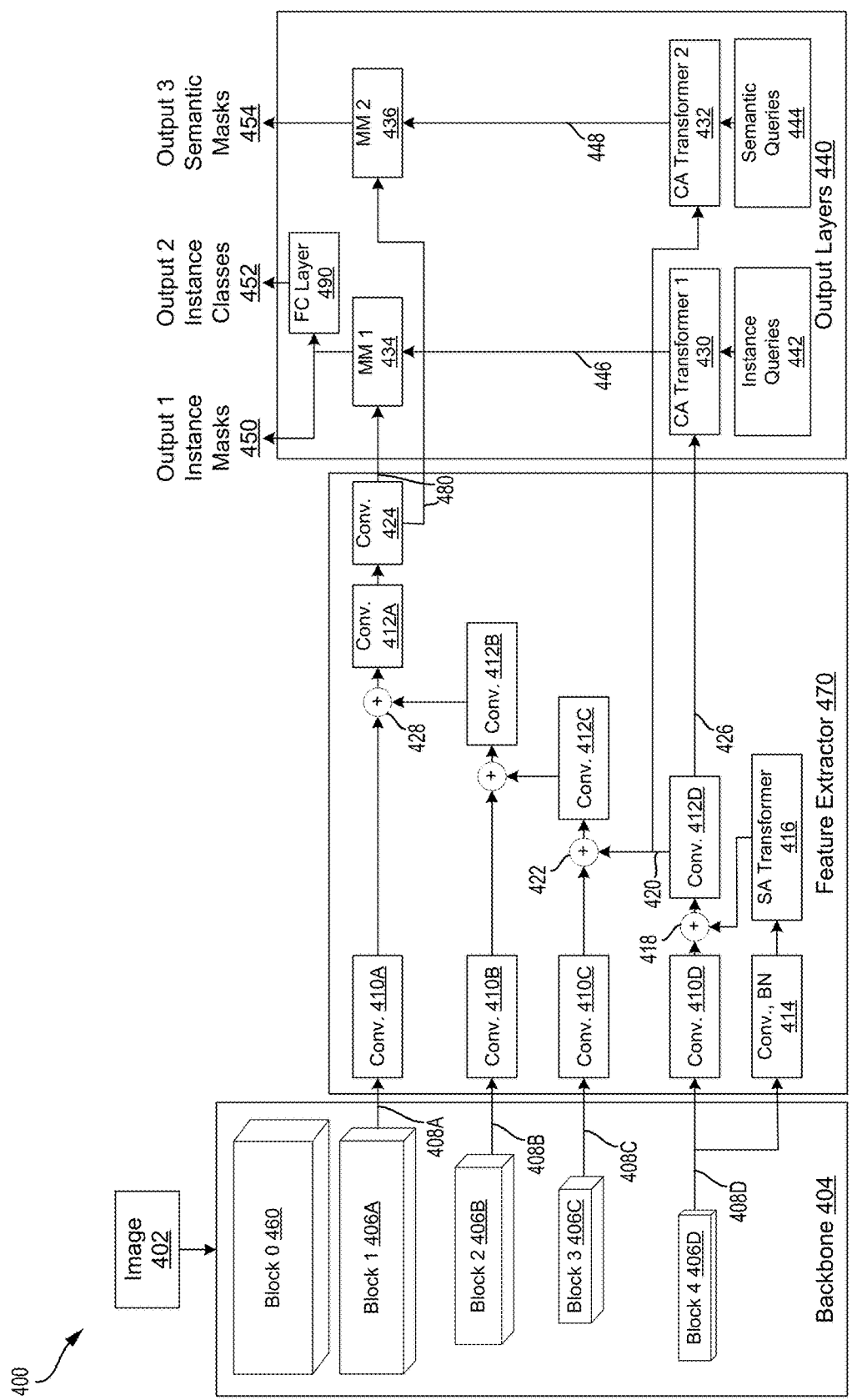
FIG. 4 is a block diagram illustrating a convolution and transformer-based machine learning (ML) model for performing image segmentation, in accordance with aspects of the present disclosure.

As discussed above, systems and techniques are described herein that provide a convolution and transformer-based image segmentation of features/objects in an image. FIG. 4 is a block diagram illustrating a convolution and transformer-based machine learning (ML) model 400 for performing image segmentation, in accordance with aspects of the present disclosure. In ML model 400, image(s) 402 may be input into a backbone 404 portion of the ML model. In some cases, the backbone 404 may extract 2D spatial features of the input image(s) 402. In some cases, the backbone 404 may be a CNN style backbone that may be used for CNN based image segmentation. For example, the backbone 404 may be similar to a backbone used in existing ML models such as ResNet50, MobileNetV2, or any similar CNN backbone. As an example, the MobileNetV2 backbone may be simplified to remove certain layers which may be either too computationally heavy, or directed at image classification tasks. In some cases, the backbone 404 may include multiple blocks 406A-406D (collectively blocks 406) which may output feature maps at multiple scales. For example, block 1 406A may output 408A a feature map with a spatial scale of ¼ of the resolution of the original image, block 2 406B may output 408B a feature map with a spatial scale of ⅛ the resolution of the original, and so forth. In some cases, the blocks may include multiple sequential operation layers and features may be passed from block to block. In some cases, the multi-scale features maps may provide feature maps of features at different semantic meaning levels (e.g., from more abstract features to more complex features). For example, blocks associated with a higher resolution, as compared to the input image 402, may generate feature maps describing more abstract features, such as edges, corners, colors, and the like. Blocks associated with lower resolutions may generate features maps describing more complex features, such as heads, arms, faces, etc. Blocks associated with the lowest resolutions, such as block 4 406D, may generate feature maps describing the highest-level features, such as complete objects like a person, trees, pets, etc. The output 408A-408D (collectively, output 408) feature maps, may be input to a convolutional layer 410A-410D of a feature extractor 470 to adapt the input feature maps. Of note, while four blocks 406 are shown, it may be understood that there may be any number of blocks at different scales. In some cases, features may not be extracted to a feature map at all scales. For example, a feature map may not be extracted from block 0 460. In some cases, features may be processed by a block, such as block 0 460 and the processed features scaled and passed to other blocks for further processing.

In some cases, the output 408D of the block associated with the lowest resolution, such as block 4 406D may also be input to a convolution and batch normalization layers 414 for feature adaption. After adaptation, the features may be input to a self-attention transformer 416. The self-attention transformer 416 may determine a global attention for the feature map. The global attention may be a similarity score of pixel pairs of the feature map, which may provide an indication of which pixels of the feature map are similar and which pixels are dissimilar. In some cases, the similarity score may be determined, for a first pixel, as against every other pixel of the feature map. In some cases, by scoring, on a per pixel basis, features of the feature map against other features, the model may be able to distinguish instances of features (e.g., each person in an image may be a separate instance of a person feature). In some cases, the self-attention transformer 416 may be used on the lowest resolution feature map to reduce computational costs. In some cases, applying self-attention/cross-attention at the lowest level may produce sufficiently good enough results. In some cases, a self-attention transformer 416 and corresponding cross-attention transformers may be applied to feature maps of other resolutions to increase quality of results, at a cost of increased computational cost/complexity.

The determined similarity scores from the self-attention transformer 416 may then be added 418 back to the adapted feature map from convolutional layer 410D. In some cases, the similarity scores may be added using an element-wise addition operation. After the similarity scores are added 418 to the adapted feature map, the output of the addition may be adapted, for example, by a second convolution operation 412D. In some cases, a second feature extractor output 420 of the convolution operation 412 may be up-sampled so the up-sampled second feature extractor output 420 may be added 422 to an adapted feature map from a convolution operation associated with a higher resolution, such as convolution operation 410C, and adapted by a second convolution operation 412C. This process then repeated so that the similarity scores are up-sampled and propagated across the different resolutions (e.g., scales) until a convolution operation (e.g., convolution operation 410A) associated with a block (e.g., block 1 406A) with the highest resolution. The similarly scores and up-sampled lower resolution feature maps may be added 428 to the adapted feature map from the convolution operation 410A and adapted by the second convolution operation 412A and a third convolution operation 424.

Third feature extractor output 480 of the third convolution operation 424 may be passed to a first matrix multiplier 434 and a second matrix multiplier 436 of the output layers to perform matrix multiplication operations. The up-sampled output 420 of the second convolution operation 412D may also be output to a second cross-attention transformer 432 of the output layers 440. A non-up-sampled first feature extractor output 426 may be output to a first cross-attention transformer 430 of the output layers 440. In some cases, a cross-attention transform may combine categories of features with queries (e.g., query 1 with a first person, query 2 with second person, and so forth).

In some cases, the output layers 440 of the ML model 400 may include two trainable queries, two cross-attention transformers, and two matrix multiplication operations. In accordance with aspects of the present disclosure, the queries of the ML model 400 may be split into two trainable queries, instance queries 442 and semantic queries 444. In some cases, queries may be used to specify an output of the ML model 400. Thus, instance queries 442 may be used to guide the model to focus on obtaining instance masks 450 and respective instance classes 452 of those instance masks 450.

For example, an instance query 442 on a category, such as persons, may return a certain number of instance masks 450 of different instances of persons (e.g., different people) in the image. In some cases, the instance query 442 may include an indication of a category to return instance masks 450 for, or the instance query 442 may return instance masks 450 for all categories that the ML model 400 can return instance masks 450 for. In some cases, the categories that the ML model 400 can return instance masks 450 for may be based on features detected at the lowest resolutions (e.g., based on block 4 406D). In some cases, there may be more instance masks 450 returned than there are instances of a category. For example, if the instance query 442 specifies retuning 10 person instances and the input image includes 4 people, then six blank instance masks 450 may be returned along with four instance masks 450 of pixels corresponding with the 4 people in the image.

To help identify such blank instances, instance classes 452 may also be output. In some cases, the instance classes 452 may be a vector with a set of probability scores (e.g., confidence scores). The probability scores may indicate, for each of the instance masks, a likelihood that an instance mask belongs to a target category (e.g., is a valid mask for an object/element of the target category). A selection of valid instance masks may be performed, for example, based on a threshold probability score.

The semantic queries 444 may be used to guide the model to focus on obtaining semantic masks 454. Semantic masks may be a mask indicating all pixels corresponding to a certain category on a single output mask. Thus, a semantic mask for a hair category may return a single mask indicating the pixels of the original image that includes the hair of all of the persons in the image. In some cases, semantic queries 444 may include a number of categories to return semantic masks 454 on, and an order of the categories in which the semantic masks 454 are returned may be predefined.

In some cases, the instance queries 442 may be passed to the first cross-attention transformer 430 of the output layers 440 and semantic queries 444 may be passed to the second cross-attention transformer 432. The first cross-attention transformer 430 may output a first set of weights 446 based on the values of first feature extractor output 426 and the instance queries 442. The second cross-attention transformer 432 may output a second set of weights 448 based on the values of the second feature extractor output 420 and the semantic queries 444.

The sets of weights (e.g., first set of weights 446 and second set of weights 448) may indicate how to combine feature maps along the channel dimension of a feature map (e.g., a channel for each recognized feature type) to generate final output masks. Output of the first cross-attention transformer 430 may be input to a first matrix multiplier 434 and output of the second cross-attention transformer 432 may be input to a second matrix multiplier 436.

The matrix multipliers (e.g., first matrix multiplier 434 and second matrix multiplier 436) may perform a matrix multiplication between the weights and the adapted feature map output from the third convolution operation 424. In this example, the highest resolution feature map (e.g., the feature map output by the first block 406A) is combined with the weights from the cross-attention transformers, but it may be understood that any feature map scale may be combined instead.

The final instance masks 450, instance classes 452, and/or semantic masks 454 may then be output by the matrix multipliers (e.g., first matrix multiplier 434 and second matrix multiplier 436). In some cases, information for the instance classes 452 from the first cross-attention transformer 430 may be passed through a fully connected layer 490 to associate the output from the first cross-attention transformer 430 to the feature instances for output as the instance classes 452.

Figure 5A:
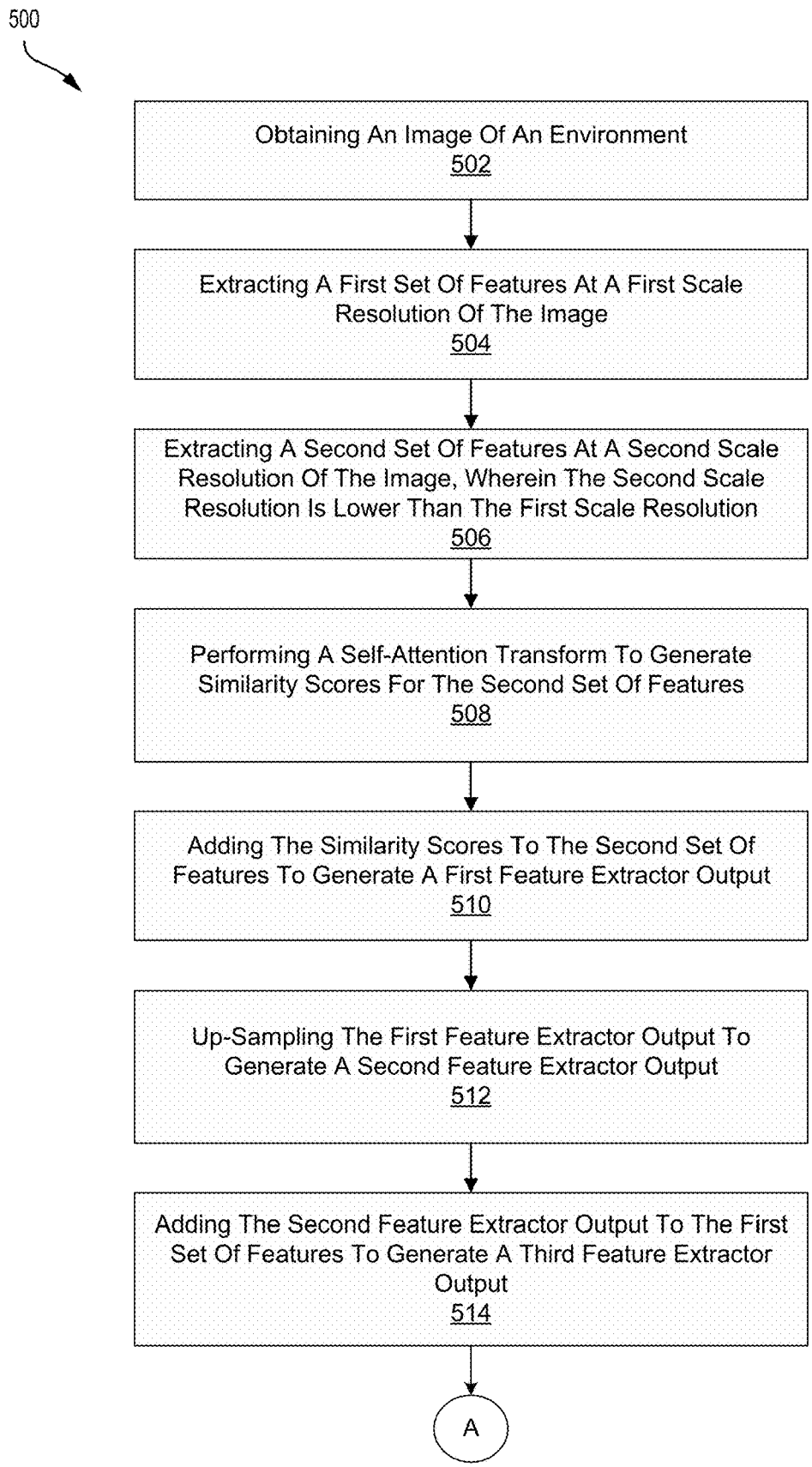
FIGS. 5A and 5B are flow diagrams illustrating a process for image processing, in accordance with aspects of the present disclosure.
Figure 5B:
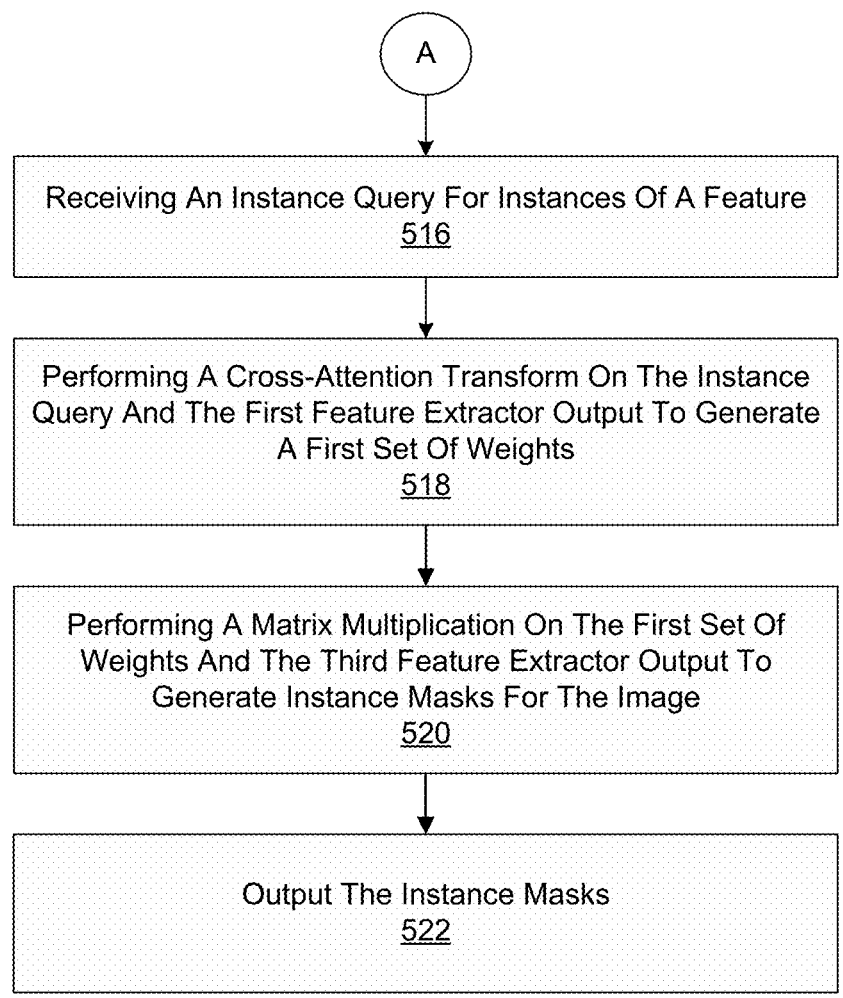

FIG. 5A and FIG. 5B are flow diagrams illustrating a process 500 for processing image data, in accordance with aspects of the present disclosure. The process 500 may be performed by a computing device (or apparatus) or a component (e.g., a chipset, codec, etc.) of the computing device, such as image capturing and processing system 100 of FIG. 1. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 500 may be implemented as software components that are executed and run on one or more processors (e.g., the image processor 150 of FIG. 1, the host processor 152 of FIG. 1, processor 610 of FIG. 6, and/or other processor(s)). In some cases, the operations of the process 500 can be implemented by a system having the architecture of computing system 600 of FIG. 6.

At block 602, the computing device (or component thereof) may obtain an image (e.g., image 402) of an environment.

At block 604, the computing device (or component thereof) may extract a first set of features at a first scale resolution of the image. For example, the computing device (or component thereof) may include a ML model, such as ML model 400, with a backbone, such as backbone 404, for extracting features.

At block 606, the computing device (or component thereof) may extract a second set of features (e.g., at block 4 406D of FIG. 4) at a second scale resolution of the image, wherein the second scale resolution is lower than the first scale resolution. In some cases, the second set of features are extracted at a lowest scale resolution of all of the extracted sets of features for the image. In some cases, the first set of features and the second set of features are extracted using a convolutional neural network based backbone. Examples of such a backbone may include ResNet50, MobileNetV2, or any similar CNN backbone. In some examples, the computing device (or component thereof) may perform a convolution operation and batch normalization operation (e.g., by convolution and batch normalization layers 414 of FIG. 4) on the second set of features.

At block 608, the computing device (or component thereof) may perform a self-attention transform (e.g., by a self-attention transformer 416 of FIG. 4) to generate similarity scores for the second set of features.

At block 610, the computing device (or component thereof) may add (e.g., added 418) the similarity scores to the second set of features to generate a first feature extractor output. In some cases, the computing device (or component thereof) may generate the first feature extractor output by performing a convolution operation (e.g., convolution operation 412D) on the added similarity scores and the second set of features.

At block 612, the computing device (or component thereof) may up-sample the first feature extractor output (e.g., second feature extractor output 420 of FIG. 4) to generate a second feature extractor output. In some cases, up-sampling allows the feature extractor output to be added to a feature map having a higher resolution.

At block 614, the computing device (or component thereof) may add (e.g., added 428 of FIG. 4) the second feature extractor output to the first set of features to generate a third feature extractor output (e.g., third feature extractor output 480 of FIG. 4).

At block 616, the computing device (or component thereof) may receive an instance query (e.g., instance query 442 of FIG. 4) for instances of a feature. In some cases, the feature received with the instance query is associated with a feature of the second set of features. In some cases, the instance query indicates a number of instances of a feature to output.

At block 618, the computing device (or component thereof) may perform a cross-attention transform (e.g., by cross-attention transformer 430 of FIG. 4) on the instance query and the first feature extractor output to generate a first set of weights. In some cases, the computing device (or component thereof) may obtain a set of probability scores based on the cross-attention transform. For example, instance classes, such as instance class 452, may be a vector with a set of probability scores. In some cases, the computing device (or component thereof) may associate probability scores of the set of probability scores with feature instances. For example, the probability scores may be arranged in the vector in an order corresponding with instances of a feature. In some cases, the computing device (or component thereof) may output the probability scores.

At block 620, the computing device (or component thereof) may perform a matrix multiplication (e.g., by first matrix multiplier 434 of FIG. 4) on the first set of weights and the third feature extractor output to generate instance masks for the image.

At block 622, the computing device (or component thereof) may output the instance masks. In some cases, the computing device (or component thereof) may receive a semantic query (e.g., semantic queries 444 of FIG. 4) for a set of feature categories. For example, a ML model may be trained to recognize categories of features, such as the sky, trees, people, faces, various objects, etc. In some cases, the computing device (or component thereof) may perform a cross-attention transform (e.g., by second cross-attention transformer 432 of FIG. 4) on the semantic query and the second feature extractor output to generate a second set of weights (e.g., second set of weights 448 of FIG. 4). In some cases, the computing device (or component thereof) may perform a matrix multiplication (e.g., by second matrix multiplier 436) on the second set of weights and the third feature extractor output to generate semantic masks (e.g., semantic masks 454) for the image. In some cases, the computing device (or component thereof) may output the semantic masks for the image.

FIG. 6 is a diagram illustrating an example of a system for implementing certain aspects of the present technology. In particular, FIG. 6 illustrates an example of computing system 600, which can be for example any computing device making up internal computing system, a remote computing system, a camera, or any component thereof in which the components of the system are in communication with each other using connection 605. Connection 605 can be a physical connection using a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example computing system 600 includes at least one processing unit (CPU or processor) 610 and connection 605 that couples various system components including system memory 615, such as read-only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, camera, accelerometers, gyroscopes, etc. Computing system 600 can also include output device 635, which can be one or more of a number of output mechanisms. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some examples, a hardware service that performs a particular function can include the software component stored in a computer-readable medium in connection with the necessary hardware components, such as processor 610, connection 605, output device 635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative Aspects of the Present Disclosure Include:

Aspect 1. A method for image processing, comprising: obtaining an image of an environment; extracting a first set of features at a first scale resolution of the image; extracting a second set of features at a second scale resolution of the image, wherein the second scale resolution is lower than the first scale resolution; performing a self-attention transform to generate similarity scores for the second set of features; adding the similarity scores to the second set of features to generate a first feature extractor output; up-sampling the first feature extractor output to generate a second feature extractor output; adding the second feature extractor output to the first set of features to generate a third feature extractor output; receiving an instance query for instances of a feature; performing a cross-attention transform on the instance query and the first feature extractor output to generate a first set of weights; performing a matrix multiplication on the first set of weights and the third feature extractor output to generate instance masks for the image; and outputting the instance masks.

Aspect 2. The method of Aspect 1, wherein the feature received with the instance query is associated with a feature of the second set of features.

Aspect 3. The method of any one of Aspects 1 or 2, wherein generating the first feature extractor output comprises performing a convolution operation on the added similarity scores and the second set of features.

Aspect 4. The method of any one of Aspects 1 to 3, wherein the first set of features and the second set of features are extracted using a convolutional neural network based backbone.

Aspect 5. The method of any one of Aspects 1 to 4, further comprising: obtaining a set of probability scores based on the cross-attention transform; associating probability scores of the set of probability scores with feature instances; and outputting the probability scores.

Aspect 6. The method of any one of Aspects 1 to 5, wherein the second set of features are extracted at a lowest scale resolution of all of the extracted sets of features for the image.

Aspect 7. The method of any one of Aspects 1 to 6, further comprising performing a convolution operation and batch normalization operation on the second set of features.

Aspect 8. The method of any one of Aspects 1 to 7, further comprising: receiving a semantic query for a set of feature categories; performing a cross-attention transform on the semantic query and the second feature extractor output to generate a second set of weights; and performing a matrix multiplication on the second set of weights and the third feature extractor output to generate semantic masks for the image.

Aspect 9. The method of Aspect 8, further comprising outputting the semantic masks for the image.

Aspect 10. The method of any one of Aspects 1 to 9, wherein the instance query indicates a number of instances of a feature to output.

Aspect 11. An apparatus for image processing, comprising: a memory; and a processor coupled to the memory and configured to: obtain an image of an environment; extract a first set of features at a first scale resolution of the image; extract a second set of features at a second scale resolution of the image, wherein the second scale resolution is lower than the first scale resolution; perform a self-attention transform to generate similarity scores for the second set of features; add the similarity scores to the second set of features to generate a first feature extractor output; up-sample the first feature extractor output to generate a second feature extractor output; add the second feature extractor output to the first set of features to generate a third feature extractor output; receive an instance query for instances of a feature; perform a cross-attention transform on the instance query and the first feature extractor output to generate a first set of weights; perform a matrix multiplication on the first set of weights and the third feature extractor output to generate instance masks for the image; and output the instance masks.

Aspect 12. The apparatus of Aspect 11, wherein the feature received with the instance query is associated with a feature of the second set of features.

Aspect 13. The apparatus of any one of Aspects 11 or 12, wherein, to generate the first feature extractor output, the processor is configured to perform a convolution operation on the added similarity scores and the second set of features.

Aspect 14. The apparatus of any one of Aspects 11 to 13, wherein the first set of features and the second set of features are extracted using a convolutional neural network based backbone.

Aspect 15. The apparatus of any one of Aspects 11 to 14, wherein the processor is further configured to: obtain a set of probability scores based on the cross-attention transform; associate probability scores of the set of probability scores with feature instances; and output the probability scores.

Aspect 16. The apparatus of any one of Aspects 11 to 15, wherein the second set of features are extracted at a lowest scale resolution of all of the extracted sets of features for the image.

Aspect 17. The apparatus of any one of Aspects 11 to 16, wherein the processor is further configured to perform a convolution operation and batch normalization operation on the second set of features.

Aspect 18. The apparatus of any one of Aspects 11 to 17, wherein the processor is further configured to: receive a semantic query for a set of feature categories; perform a cross-attention transform on the semantic query and the second feature extractor output to generate a second set of weights; and perform a matrix multiplication on the second set of weights and the third feature extractor output to generate semantic masks for the image.

Aspect 19. The apparatus of Aspect 18, wherein the processor is further configured to output the semantic masks for the image.

Aspect 20. The apparatus of any one of Aspects 11 to 19, wherein the instance query indicates a number of instances of a feature to output.

Aspect 21. A non-transitory computer-readable medium having stored thereon instructions that, when executed by a processor, cause the processor to: obtain an image of an environment; extract a first set of features at a first scale resolution of the image; extract a second set of features at a second scale resolution of the image, wherein the second scale resolution is lower than the first scale resolution; perform a self-attention transform to generate similarity scores for the second set of features; add the similarity scores to the second set of features to generate a first feature extractor output; up-sample the first feature extractor output to generate a second feature extractor output; add the second feature extractor output to the first set of features to generate a third feature extractor output; receive an instance query for instances of a feature; perform a cross-attention transform on the instance query and the first feature extractor output to generate a first set of weights; perform a matrix multiplication on the first set of weights and the third feature extractor output to generate instance masks for the image; and output the instance masks.

Aspect 22. The non-transitory computer-readable medium of Aspect 21, wherein the feature received with the instance query is associated with a feature of the second set of features.

Aspect 23. The non-transitory computer-readable medium of any one of Aspects 21 or 22, wherein, to generate the first feature extractor output, the instructions cause the processor to perform a convolution operation on the added similarity scores and the second set of features.

Aspect 24. The non-transitory computer-readable medium of any one of Aspects 21 to 23, wherein the first set of features and the second set of features are extracted using a convolutional neural network based backbone.

Aspect 25. The non-transitory computer-readable medium of any one of Aspects 21 to 24, wherein the instructions cause the processor to: obtain a set of probability scores based on the cross-attention transform; associate probability scores of the set of probability scores with feature instances; and output the probability scores.

Aspect 26. The non-transitory computer-readable medium of any one of Aspects 21 to 25, wherein the second set of features are extracted at a lowest scale resolution of all of the extracted sets of features for the image.

Aspect 27. The non-transitory computer-readable medium of any one of Aspects 21 to 26, wherein the instructions cause the processor to perform a convolution operation and batch normalization operation on the second set of features.

Aspect 28. The non-transitory computer-readable medium of any one of Aspects 21 to 27, wherein the instructions cause the processor to: receive a semantic query for a set of feature categories; perform a cross-attention transform on the semantic query and the second feature extractor output to generate a second set of weights; and perform a matrix multiplication on the second set of weights and the third feature extractor output to generate semantic masks for the image.

Aspect 29. The non-transitory computer-readable medium of Aspect 28, wherein the instructions cause the processor to output the semantic masks for the image.

Aspect 30. The non-transitory computer-readable medium of any one of Aspects 21 to 29, wherein the instance query indicates a number of instances of a feature to output.

Aspect 31: An apparatus for image generation, comprising means for performing one or more of operations according to any of Aspects 1 to 10.

What is claimed is:

1. A method for image processing, comprising:
   obtaining an image of an environment;
   extracting a first set of features at a first scale resolution of the image;
   extracting a second set of features at a second scale resolution of the image, wherein the second scale resolution is lower than the first scale resolution;
   performing a self-attention transform to generate similarity scores for the second set of features;
   adding the similarity scores to the second set of features to generate a first feature extractor output;
   up-sampling the first feature extractor output to generate a second feature extractor output;
   adding the second feature extractor output to the first set of features to generate a third feature extractor output;
   receiving an instance query for instances of a feature;
   performing a cross-attention transform on the instance query and the first feature extractor output to generate a first set of weights;
   performing a matrix multiplication on the first set of weights and the third feature extractor output to generate instance masks for the image; and
   outputting the instance masks.

2. The method of claim 1, wherein the feature received with the instance query is associated with a feature of the second set of features.

3. The method of claim 1, wherein generating the first feature extractor output comprises performing a convolution operation on the added similarity scores and the second set of features.

4. The method of claim 1, wherein the first set of features and the second set of features are extracted using a convolutional neural network based backbone.

5. The method of claim 1, further comprising:
   obtaining a set of probability scores based on the cross-attention transform;
   associating probability scores of the set of probability scores with feature instances; and
   outputting the probability scores.

6. The method of claim 1, wherein the second set of features are extracted at a lowest scale resolution of all of the extracted sets of features for the image.

7. The method of claim 1, further comprising performing a convolution operation and batch normalization operation on the second set of features.

8. The method of claim 1, further comprising:
   receiving a semantic query for a set of feature categories;
   performing a cross-attention transform on the semantic query and the second feature extractor output to generate a second set of weights; and
   performing a matrix multiplication on the second set of weights and the third feature extractor output to generate semantic masks for the image.

9. The method of claim 8, further comprising outputting the semantic masks for the image.

10. The method of claim 1, wherein the instance query indicates a number of instances of a feature to output.

11. An apparatus for image processing, comprising:
   a memory; and
   a processor coupled to the memory and configured to:
      obtain an image of an environment;
      extract a first set of features at a first scale resolution of the image;
      extract a second set of features at a second scale resolution of the image, wherein the second scale resolution is lower than the first scale resolution;
      perform a self-attention transform to generate similarity scores for the second set of features;
      add the similarity scores to the second set of features to generate a first feature extractor output;
      up-sample the first feature extractor output to generate a second feature extractor output;
      add the second feature extractor output to the first set of features to generate a third feature extractor output;
      receive an instance query for instances of a feature;
      perform a cross-attention transform on the instance query and the first feature extractor output to generate a first set of weights;
      perform a matrix multiplication on the first set of weights and the third feature extractor output to generate instance masks for the image; and
      output the instance masks.

12. The apparatus of claim 11, wherein the feature received with the instance query is associated with a feature of the second set of features.

13. The apparatus of claim 11, wherein, to generate the first feature extractor output, the processor is configured to perform a convolution operation on the added similarity scores and the second set of features.

14. The apparatus of claim 11, wherein the first set of features and the second set of features are extracted using a convolutional neural network based backbone.

15. The apparatus of claim 11, wherein the processor is further configured to:
   obtain a set of probability scores based on the cross-attention transform;
   associate probability scores of the set of probability scores with feature instances; and
   output the probability scores.

16. The apparatus of claim 11, wherein the processor is further configured to extract the second set of features at a lowest scale resolution of all of the extracted sets of features for the image.

17. The apparatus of claim 11, wherein the processor is further configured to perform a convolution operation and batch normalization operation on the second set of features.

18. The apparatus of claim 11, wherein the processor is further configured to:
   receive a semantic query for a set of feature categories;
   perform a cross-attention transform on the semantic query and the second feature extractor output to generate a second set of weights; and
   perform a matrix multiplication on the second set of weights and the third feature extractor output to generate semantic masks for the image.

19. The apparatus of claim 18, wherein the processor is further configured to output the semantic masks for the image.

20. The apparatus of claim 11, wherein the instance query indicates a number of instances of a feature to output.

21. A non-transitory computer-readable medium having stored thereon instructions that, when executed by a processor, cause the processor to:
   obtain an image of an environment;
   extract a first set of features at a first scale resolution of the image;
   extract a second set of features at a second scale resolution of the image, wherein the second scale resolution is lower than the first scale resolution;
   perform a self-attention transform to generate similarity scores for the second set of features;
   add the similarity scores to the second set of features to generate a first feature extractor output;
   up-sample the first feature extractor output to generate a second feature extractor output;
   add the second feature extractor output to the first set of features to generate a third feature extractor output;
   receive an instance query for instances of a feature;
   perform a cross-attention transform on the instance query and the first feature extractor output to generate a first set of weights;
   perform a matrix multiplication on the first set of weights and the third feature extractor output to generate instance masks for the image; and
   output the instance masks.

22. The non-transitory computer-readable medium of claim 21, wherein the feature received with the instance query is associated with a feature of the second set of features.

23. The non-transitory computer-readable medium of claim 21, wherein, to generate the first feature extractor output, the instructions cause the processor to perform a convolution operation on the added similarity scores and the second set of features.

24. The non-transitory computer-readable medium of claim 21, wherein the first set of features and the second set of features are extracted using a convolutional neural network based backbone.

25. The non-transitory computer-readable medium of claim 21, wherein the instructions cause the processor to:
   obtain a set of probability scores based on the cross-attention transform;
   associate probability scores of the set of probability scores with feature instances; and
   output the probability scores.

26. The non-transitory computer-readable medium of claim 21, wherein the instructions cause the processor to extract the second set of features at a lowest scale resolution of all of the extracted sets of features for the image.

27. The non-transitory computer-readable medium of claim 21, wherein the instructions cause the processor to perform a convolution operation and batch normalization operation on the second set of features.

28. The non-transitory computer-readable medium of claim 21, wherein the instructions cause the processor to:
   receive a semantic query for a set of feature categories;
   perform a cross-attention transform on the semantic query and the second feature extractor output to generate a second set of weights; and
   perform a matrix multiplication on the second set of weights and the third feature extractor output to generate semantic masks for the image.

29. The non-transitory computer-readable medium of claim 28, wherein the instructions cause the processor to output the semantic masks for the image.

30. The non-transitory computer-readable medium of claim 21, wherein the instance query indicates a number of instances of a feature to output.

* * * * *